United States Patent [19]

Goodman et al.

[11] Patent Number: 4,483,242

[45] Date of Patent: Nov. 20, 1984

[54] AUTOMATED FOOD PROCESSING EQUIPMENT

[75] Inventors: William D. Goodman, Dallas; Dan Sutherland, Red Oak, both of Tex.

[73] Assignee: Campbell-Taggart, Inc., Dallas, Tex.

[21] Appl. No.: 359,874

[22] Filed: Mar. 19, 1982

[51] Int. Cl.³ .............................................. A21C 9/06
[52] U.S. Cl. ..................................... 99/450.6; 53/210; 53/465; 99/450.1; 99/450.7; 425/96; 425/112
[58] Field of Search ........................... 99/450.1–450.6, 99/352–356, 450.7; 426/500–502, 297; 53/210, 211, 216, 465, 228, 229, 232; 425/112, 117, 324.1, 96

[56] References Cited

U.S. PATENT DOCUMENTS

| | | |
|---|---|---|
| 3,379,139 | 4/1968 | Lipinsky . |
| 3,669,007 | 6/1972 | Pulici . |
| 3,946,656 | 3/1976 | Hai . |
| 4,014,254 | 2/1977 | Ohkawa . |
| 4,084,493 | 4/1978 | Quintana . |
| 4,313,719 | 2/1982 | Lundgren . |

FOREIGN PATENT DOCUMENTS

| | | |
|---|---|---|
| 1440770 | 5/1965 | France . |
| 1350447 | 4/1974 | United Kingdom . |

*Primary Examiner*—Timothy F. Simone
*Attorney, Agent, or Firm*—Gerald G. Crutsinger; John F. Booth; Monty L. Ross

[57] ABSTRACT

A food processing machine for folding rolled sandwich type food products comprising a plurality of conveyor bands for conveying food products through first, second, third and fourth folding mechanisms, the first, third and fourth folding mechanisms each including a U-shaped bracket member with tines extending between said conveyor bands and mounted for movement in an arcuate path over said conveyor bands whereby during passage of said food product said tines lift a front portion of said product and fold it back over a following portion of said product, and the second folding mechanism comprising additional conveyor bands positioned to the outer sides of said first mentioned conveyor bands with the tangent line between the last mentioned bands changing progressively along the path of travel of said bands from essentially a horizontal orientation to a near vertical orientation whereby the side portions of a food product carried therethrough are lifted and folded over a center portion of said food product; additional creaser means are provided to establish definite transverse and longitudinal fold lines in said products.

29 Claims, 16 Drawing Figures

FIG. I

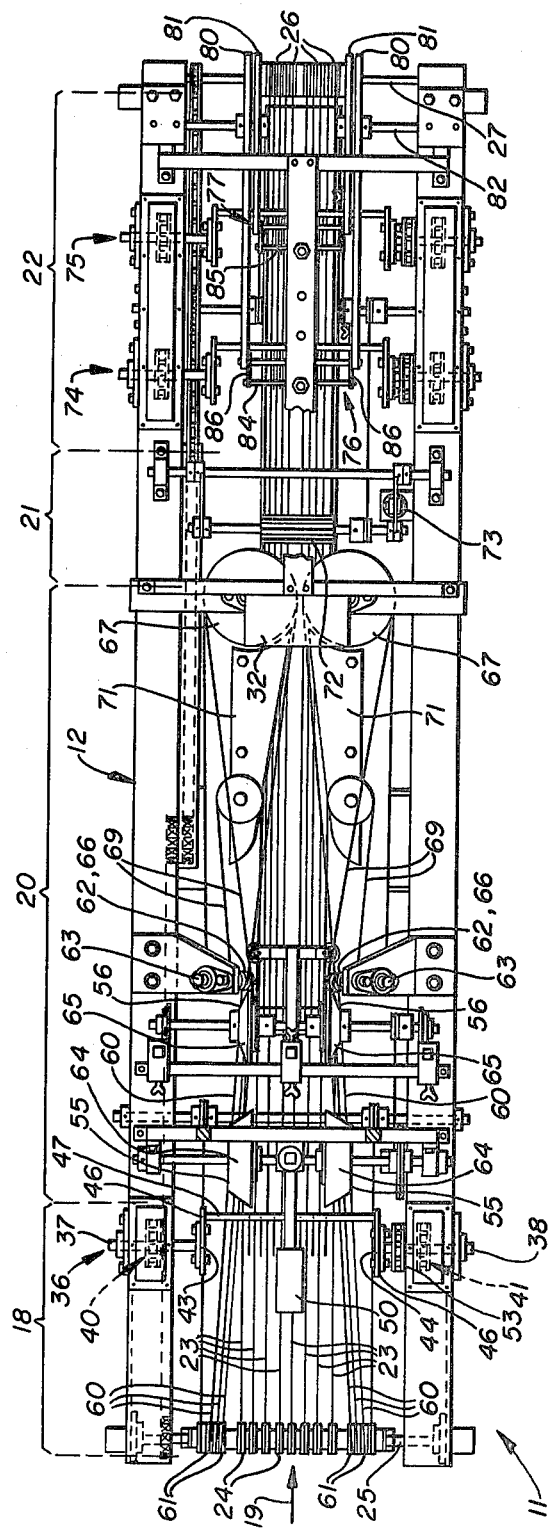
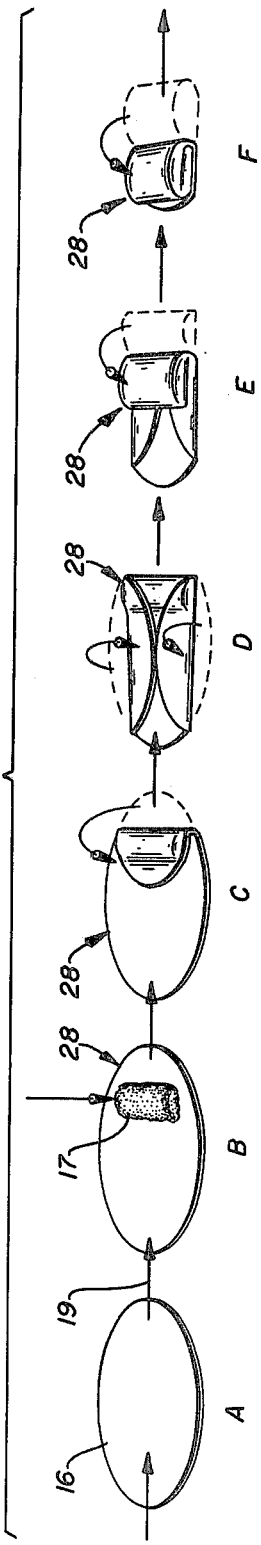
FIG. 2
FIG. 10

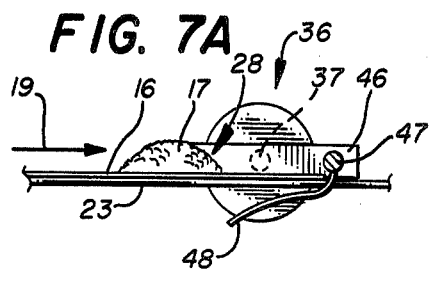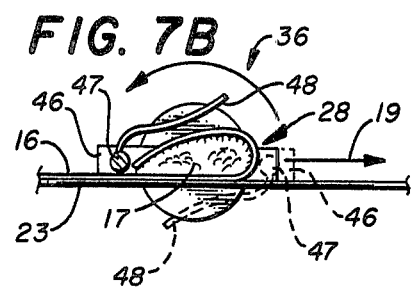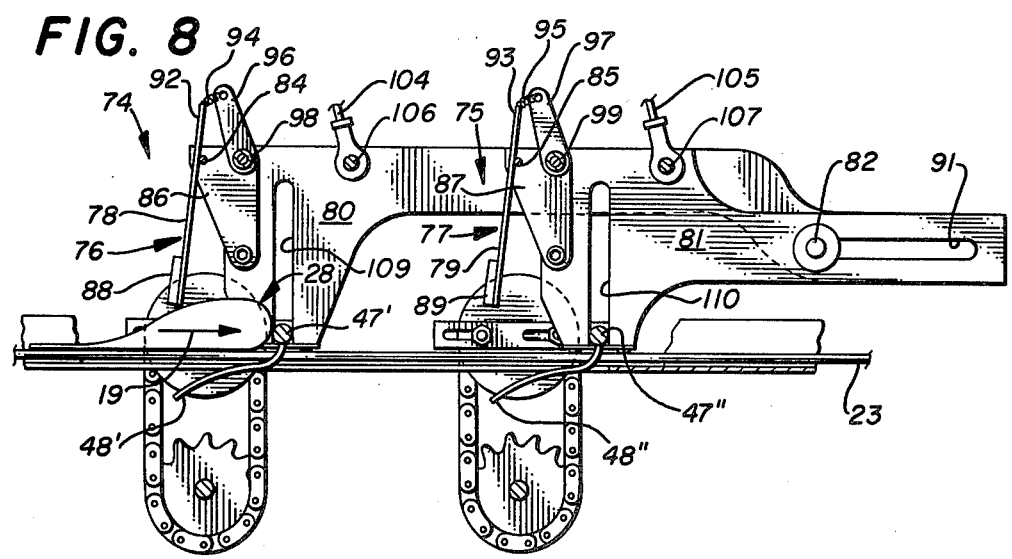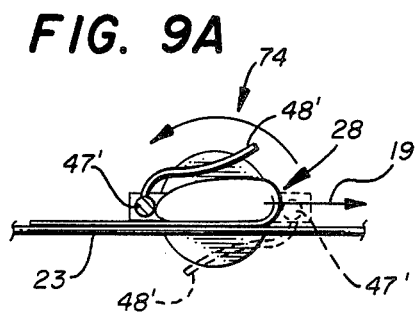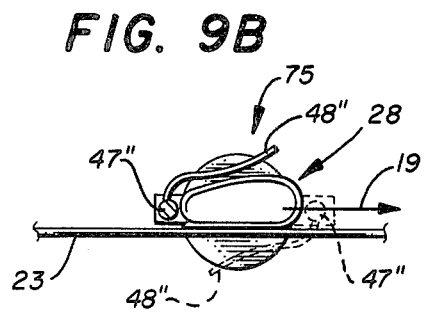

AUTOMATED FOOD PROCESSING EQUIPMENT

BACKGROUND OF THE INVENTION

This invention relates to automated food preparation equipment and, more particularly, to machinery for the preparation of foods wrapped in flat bread or dough-like edible material.

Previous attempts to automate the preparation of certain foods which include an edible dough or flat bread-like outer covering wrapped around a filler have not been totally successful. The high volume preparation of foods such as burritos and the like for sale as frozen or refrigerated 'convenience' dishes relys, for the most part, on human labor to wrap, roll or fold the outer covering around the filler material of such foods.

The burrito presents particular problems in that the finished product must be folded more than once about fold lines extending at right angles to each other. To applicant's knowledge automated equipment capable of adequately performing the difficult multiple folds required to form a burrito has, until now, been nonexistent. The manual labor used for the fold operation has added to the expense of these products and has inherently created inconsistencies in the quality of the finished product.

BRIEF DESCRIPTION OF THE INVENTION

The present invention is particularly designed for the automated preparation of certain Mexican style foods known as burritos. The prinicipals used can be adapted to any other foods requiring a particular type of rolling, wrapping or folding.

In the automated preparation of burritos by the present invention, a self-contained food processing apparatus is used. A flour tortilla having a measured amount of cooked spiced ground meat or other filler deposited on it is delivered to the processing apparatus for folding. The processing apparatus has a conveyor comprised of a number of continuous bands or belts laterally spaced but sufficiently close together to provide adequate support for the tortilla wrapper without tearing or other damage. Each tortilla-filler product unit is transported by the conveyor at a constant rate through the successive stations of the processor to be creased and folded into the final product form.

The first station of the processor comprises an initial fold mechanism. This mechanism includes a rake-like member having fingers or tines extending down through the conveyor between the belts in a direction toward the "front" end of the processor. When the product unit arrives at the proper position, the fingers of the fold mechanism are actuated to move up through the conveyor belts and move with an arc-like motion to lift the leading edge of the tortilla and lay it gently back over the top of the filler to form a transverse fold. This fold is accomplished while the product unit is in continuous movement through the station. As the fold is made the product unit passes under the folding mechanism. After the product unit has passed, the fold mechanism is returned to its initial "ready" position to await the arrival of the next product unit. At a second station, the burrito unit with its first transverse fold passes under a pair of frustro-conical "crease wheels". These wheels delineate longitudinal fold lines on each side of the filler along which the two "side flaps" of the tortilla are to be folded across the filler mound. At the same time, the longitudinal side folds are started by the action of the outer most conveyor belts forcing the "side flap" areas of the tortilla against the inclined surface of the crease wheels. As the product unit moves further into the second station, the tortilla side flaps are carried by the conveyor belts across a second pair of more steeply sloped frustro-conical wheels after which gravity, aided by pair of guide members, completes the fold with the flaps falling neatly inward across the mound of filler material. At a subsequent station, the partially folded burrito unit passes under a roller to even the distribution of filler within the pocket formed by the folds to produce a more uniform thickness across the unit. Thereafter, the unit is advanced through two additional transverse fold stations, each similar in structure to the first fold station but with the addition of a creasing blade. At these fold stations, the filled pocket is twice folded transversely back onto the tortilla to complete the burrito unit. From the fold processor, the completed product units are conveyed to packaging, refrigeration, freezing or other processing areas.

All folds, both transverse and longitudinal, are accomplished without the necessity for intermittent motion of the conveyor with the difficulties resulting when such motion is required and without the necessity of reorienting the product unit as it moves along the conveyor. The fold processor of the present invention is a self-contained unit incorporating all of the necessary motors, sensors, activators and controls so that it is adopted for insertion in existent food preparation production lines without special connections, hook-ups and adapters.

It is an object of the present invention to provide an automated self-contained food processing apparatus to fold "wrapped" food products.

It is another object to provide an automated food processing apparatus to fold burritos and like products while they are being moved continuously non-intermittently along a conveyor.

It is a still further object to provide an automated self-contained food product folding apparatus adapted for either stand-alone operation or for integral production line operation.

It is yet another object to provide an automated food processor for folding soft thin dough-like food products in multiple directions without reorientation of the product relative to the conveyor.

It is a further object to provide a food folding processor mechanism which is simple and efficient to manufacture and use.

BRIEF DESCRIPTION OF THE DRAWINGS

These an other objects and advantages of the present invention will become apparent from the following detailed description when read with reference to the accompanying drawings wherein:

FIG. 2 is a top view of the processor of FIG. 1;

FIGS. 7A and 7B schematically depict the operation of the first fold station of the processor of the present invention;

FIG. 8 is a side elevation section taken along lines 8—8 of FIG. 5;

FIGS. 9A and 9B schematically illustrate the operation of the final fold stations of the processor;

FIG. 10 depicts the fold sequence carried out by the processor of the present invention in completing a burrito;

DETAILED DESCRIPTION

Figure 1:
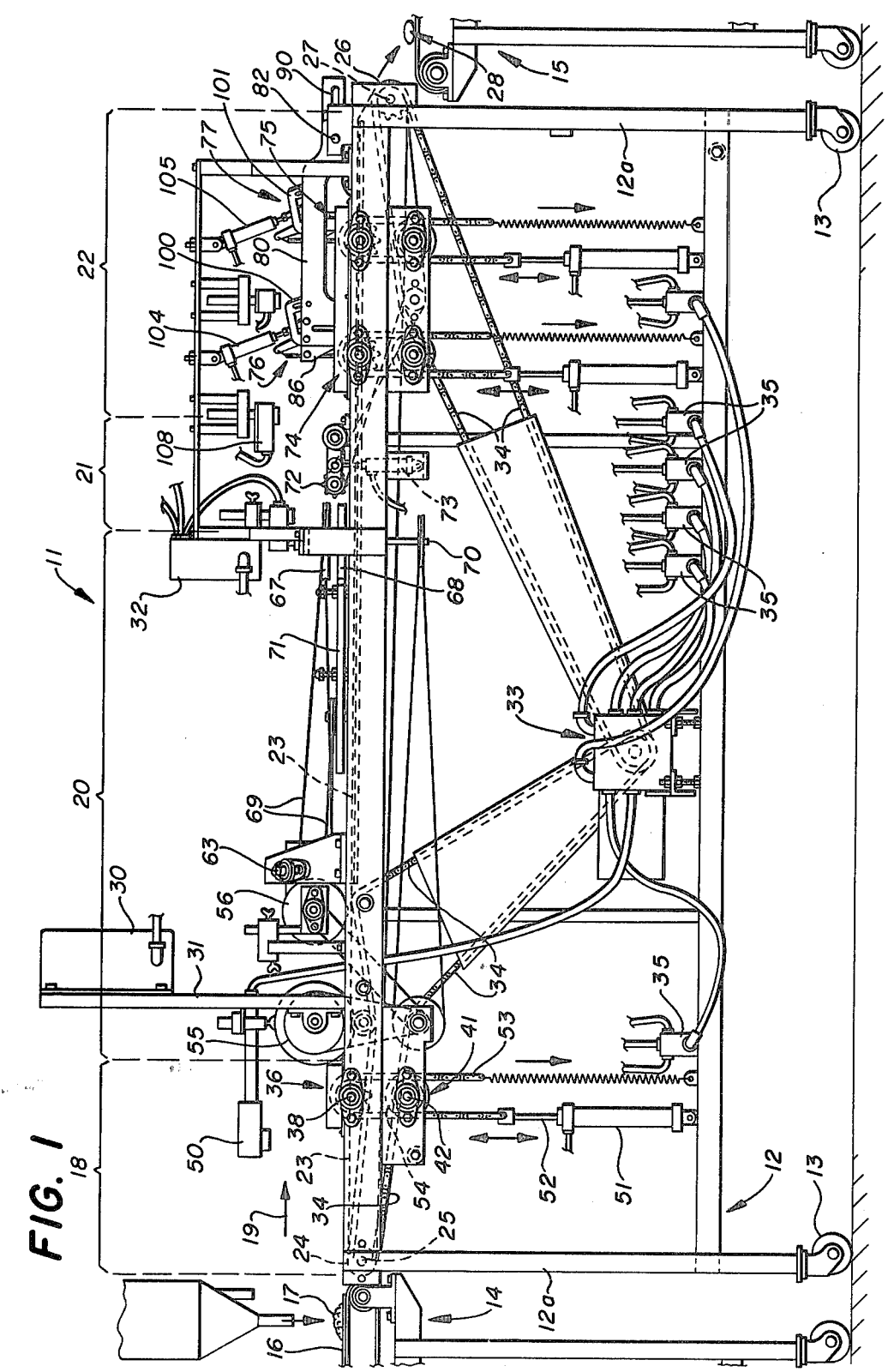
FIG. 1 is a side elevation illustrating one embodiment of the food processor of the present invention with selected parts shown in phantom and others partially cut away.

With reference now to the drawings and particularly FIGS. 1 and 2, the folding processor of the present invention, designated generally as 11, will be described. The processor 11 is a self-contained unit with all power supplies, drive mechanisms, controls, sensors and detectors built on a single frame 12. The frame 12 is preferably equipped with wheels such as rollers or casters 13. If desirable, the upright members 12A of the frame 12 may be made adjustable in length in order that the processor 11 may be accommodated in production line facilities with various height requirements. The food product may be supplied to the processor 11 from a separate conveyor 14 and the output product of the processor 11 may be removed by another conveyor 15 for transport to other processing operations such as refrigeration, freezing and/or packaging.

The operations and fold sequence to be carried out on the food product are depicted in FIGS. 10A–F. A tortilla 16 (FIG. 10A) which may be about ten inches in diameter, has deposited on it a measured amount of filler 17 such as spiced cooked ground meat (FIG. 10B). The tortilla-filler product unit 28 is then transferred from conveyor 14 to the conveyor of the processor 11 and carried by it to the first work station 18 of the processor 11. At this work station the forward lip of the tortilla is folded along a transverse fold line back over the filler (FIG. 10C). As the product unit progresses through the next work station 20, "side flaps" of the tortilla are folded along longitudinal fold lines inwardly (FIG. 10D). Processing to a uniform thickness and even distribution of the filler (not illustrated) occurs at a third work station 21. A second "roll back" fold (FIG. 10E) and a final fold (FIG. 10F) are produced in station 22 of the processor.

In FIGS. 1 and 2, the conveyor of processor 11 is shown and comprises eight endless belts or bands 23 which extend the length of the processor. The bands 23 are looped around drive pulleys 24 on shaft 25 at the front-end and drive pulleys 26 on shaft 27 at the output or back-end of the processor. The bands 23 may be further supported at various points along their length by idler pulleys (not shown). The drive and idler pulleys maintain the bands 23 in a laterally-spaced relationship but close enough together to provide adequate support for the food product 28 as it is processed.

The main controls and electronics for the processor are housed in enclosure 30 which may be supported above the general level of the processor on risers 31 or in any other location convenient for operating personnel. Supplemental controls and electronics may be housed in another enclosure 32. A motor 33 powers drive chains or belts 34 as well as a pump (hidden from view) supplying pressurized fluid through the electrically actuated control valves 35 to the various hydraulic or pneumatic actuators. The conveyor or other mechanisms are driven by belts 34 through sprockets on various shafts including shafts 25 and 27 in a manner well known in the art.

Figure 4:
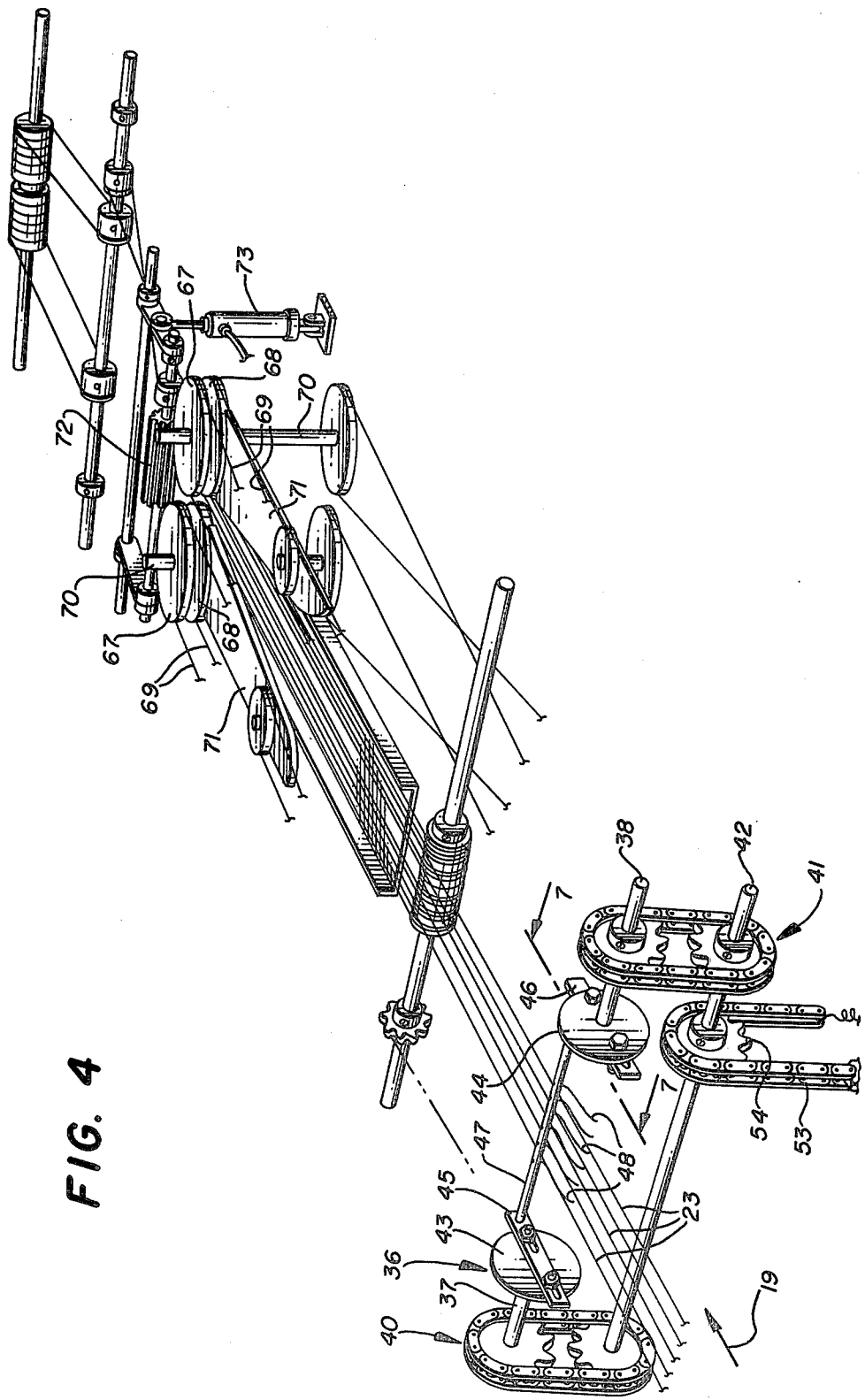
FIG. 4 is a schematic perspective view of a major portion of the conveyor parts of the present invention also with many parts such as the crease rollers cut away or totally omitted for better illustration.

The operation of the first work or fold station 18 will be described with particular reference to FIGS. 1, 2, 4, 7A and 7B. A tortilla 16 and filler 17, which together constitute a product unit 28 as shown in FIG. 10B, are supplied to conveyor bands 23 at the front-end of the processor and are moved in the direction indicated by arrow 19 by the belts 23 toward the first fold mechanism designated generally as 36. As was pointed out previously, prior to entering the work station 18 the filler 17 had been dispensed onto the tortilla 16 by conventional dispensing apparatus. Fold mechanism 36 comprises a pair of axially aligned rotor shafts 37 and 38 coupled for simultaneous operation through sprocket and chain arrangements 40 and 41 respectively to a common drive shaft 42 mounted on frame 12 as shown. Affixed to the inner ends of shafts 37 and 38 are members 43 and 44. Brackets 45 and 46 are adjustably mounted on members 43 and 44 and carry a rod 47 from which a plurality of tines 48 extend. As best shown in FIGS. 4 and 7A, tines 48 are spaced to extend between the conveyor bands 23. In the "ready" position of fold mechanism 36, rod 47 is positioned near the conveyor surface "downstream" from rotor shafts 37 and 38. The tines 48 extend below the conveyor bands and point toward the front-end of the processor. As the tortilla and filler unit 28 enters the fold station 18, the position of the leading edge of the tortilla 16 is detected by a photosensor 50 or other appropriate detector.

In response to an output from detector 50 and after an appropriate delay to allow tortilla filler unit 28 to reach the position shown in FIG. 7A, conventional control circuitry in enclosure 30 actuates the appropriate fluid control unit 35 to supply pressurized fluid to fluid actuator 51. In the present embodiment actuator 51 is a double acting hydraulic cylinder, but it is to be understood that other types of actuators can be used. The supply of hydraulic fluid from unit 35 causes the piston arm 52 of actuator 51 to be pulled downward (FIG. 1) drawing drive chain 53 across sprocket 54, to turn drive shaft 42 counter-clockwise. Through sprocket and chain arrangements 40 and 41, shafts 37 and 38 are turned in a counter-clockwise direction.

This movement causes rod 47 and tines 48 to be carried in an arc by brackets 45 and 46 up and over the axis of rotation of shafts 37 and 38 to the position shown in FIG. 7B. As the tines 48 are lifted through the conveyor belts, they carry the leading edge 16a of tortilla 16 upward and, lay this "edge" 16a back over the mound of filler 17 as the conveyor moves the whole product unit 28 forward. This action completes the first fold, illustrated in FIG. 10C. As is shown in FIG. 7B, not only is the first fold of the product unit 28 complete after a 180° rotation of shafts 37 and 38, but also the tines 48 are moved out of the path of the continued movement of the product unit 28 along the conveyor. Note that this is a continuous and smooth movement of the product unit requiring no intermittent movement of the conveyor or product.

Either by preset timing or by sensor detection, the fold mechanism 36 is returned to the "ready" position after the product unit 28 with its first fold, has passed completely through the fold mechanism and is out of the way.

The side folds illustrated in FIG. 10D are formed as the food product unit passes through work station 20. Station 20 is shown in FIGS. 1, 2, 3 and 4 and features two pairs of crease wheels 55 and 56 mounted on and driven through shafts 57 and 58 respectively. The coupling arrangements to drive the various crease wheels, conveyor, retainer and folder belts and bands from drive chain 34 are shown in the drawings. Their operation is, of course, well known to persons skilled in the art. Additionally, many forms of drive arrangements are adequate to drive shafts 57 and 58. Additional sets of three retainer belts or bands 60 are positioned on either side of the conveyor bands 23. The bands 60 extend from pulleys 61 on shaft 25 to and around the pulleys 62 on inclined shaft 63. These bands 60 pass under crease wheels 55 and 56 in contact with the inclined surfaces 64 and 65, and wheels 55 and 56, respectively. A set of two folder belts or bands 69 on each side of the conveyor extend from pulleys 66 on the inclined shafts 63 to and around large coaxial pulleys 67 and 68 on vertical shafts 70.

As product unit 28 is moved through fold station 18, the side flaps 16b of tortilla 16 are supported and carried by retainer bands sets 60. In station 20 the bands 60 carry the side flaps 16b of tortilla 16 into contact with and under the inclined surfaces 64 of wheels 55. The edges of the crease wheels 55 at their larger diameter produce slight creases longitudinally along the tortilla 16 which delineate the fold lines for the side flaps 16b on product 28. As product 28 continues through station 20, retainer band sets 60 lift the side flaps 16b further and into contact with the more steeply inclined surface 65 of wheels 56. Thus, these side flaps of product 28 are in a nearly vertical position as they pass over the pulleys 62 and 66 on inclined shaft 63.

As the conveyor bands 23 carry the product 28 past inclined shaft 63 and pulleys 62 and 66, folder belt set 69 takes over support and control of the side flaps 16b. As the bands 69 move between pulleys 66 to the pulleys 67 and 68, the angle of the tangent line between the belts of the set changes from the incline angle of shaft 63 to near vertical at pulleys 67 and 68. At the same time, these folder bands are positioned to slant toward the center of the line of the conveyor belts 23. Thus, as the side flaps 16b ride along the folder bands 69 toward pulleys 67 and 68, gravity causes them to fall inwardly on the product unit 28 producing a neat fold along the longitudinal crease line initiated by crease wheels 55. Product unit 28 then emerges from fold station 20 formed as shown in FIG. 10D. Because the fold bands 69 are of necessity flexible and somewhat elastic, their folding action can be made more positive by positioning a set of backing plates 71 along their path. These backing plates 71 prevent the bands 69 from flexing too much. It should be noted that the lowest of the belts 69 and the lower edge of backing plates 71 are positioned a distance above the conveyor belts 23. This distance is sufficient to allow the product units 28, to pass under the fold belts 69 and backing plates 71 without touching them after the side folds are complete. If desired, pulley 68 may be of slightly smaller diameter than pulley 67 or shafts 70 may be inclined slightly inwardly at their tops to cause the angle of the tangent line of the fold belts 69 to go past vertical to an inwardly inclined attitude.

Product unit 28 is next carried into station 21 where it passes under a leveling roller 72. Roller 72 exerts a preset rolling pressure on product 28 as produced by a fluid actuator 73 under the control of the central control system through a control valve 35. This operation of station 21 produces a more uniform distribution of the filler within the pocket formed by the rods and a generally even thickness across the product unit 28 results.

Fold station 22 comprises two fold mechanisms 74 and 75. Fold mechanisms 74 and 75 are very similar to the fold mechanism 36 of station 18. The parts of fold mechanisms 74 and 75 corresponding to like parts of fold mechanism 36 and identified by the same reference numerals primed or double-primed respectively in the two mechanisms. Each of the fold mechanisms 74 and 75, however, additionally comprises a crease plate structure to assist in the folding operation.

As shown in FIGS. 1, 2, 5 and 8 crease plate structures 76 and 77 operate in conjunction with fold mechanisms 74 and 75 respectively. Crease plate structure 76 is supported on brackets 80. The brackets 80 are mounted on shaft 82 for both pivotal and sliding action by means of slot 90. Similar but shorter brackets 81 carrying crease plate structure 77 are mounted on the same shaft 82 in the same manner through slots 91. Brackets 81 are mounted "inboard" between brackets 80.

Figure 6:
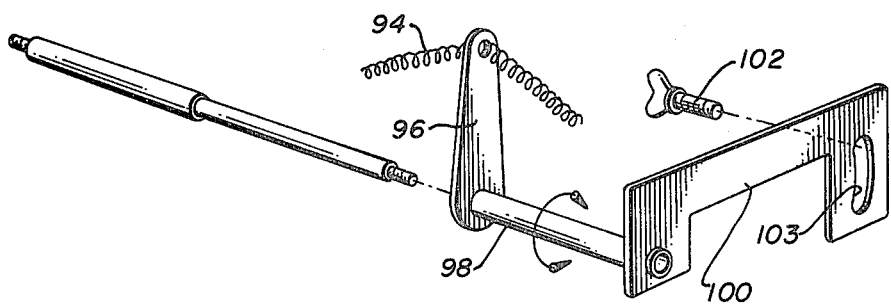
FIG. 6 schematically depicts parts of the crease plate mounting mechanism of the last two fold stations.

In the crease plate structures 76 and 77 plates 78 and 79 are secured respectively to shafts 84 and 85 mounted between mounting plates 86 and between mounting plates 87, respectively. Shafts 84 and 85 are free to rotate in their mountings. Plates 78 and 79 have weights 88 and 89 attached to their lower edges and tab extensions 92 and 93 from this top edges. Springs 94 and 95 are connected from extension tabs 92 and 93 to lever arms 96 and 97 affixed to rods 98 and 99. Rods 98 and 99 are supported between brackets 80 and 81. Adjustment brackets 100 and 101 also affixed to rods 98 and 99 control the positions of lever arms 96 and 97. A thumb screw 102 threaded into bracket 80 through slot 103 may be tightened to clamp adjustment arm 100 in a selected position (see FIG. 6). A similar arrangement may be used to clamp adjustment arm 101.

The approach of a product unit 28 to work station 22 on conveyor belts 23 is sensed and indicated by a detector 108. Detector 108 may be a photocell or other suitable sensor. As the unit 28 reaches the position illustrated in FIG. 8, fluid actuator 104 applies controlled pressure to rod 106 mounted on and between brackets 80 lowering the forward ends of brackets 80 to bring crease plate 78 into contact with unit 28 with gentle, yet sufficient, pressure to establish a desired fold line in product 28. Adjustment of the exact location of this fold line can be accomplished by positioning arm 96 as will be explained subsequently. The fold mechanism 74 operates in a manner previously explained in the discussion of fold station 18 so that rod 47' and tines 48' are moved through the arcuate path to lift and "flip" the filled pocket of product unit 28 to form the next fold as illustrated by FIGS. 9A and 10E. As the fold mechanism operates, rod 47' rides within slots 109 to move the brackets 80 and crease plate structure 76 mounted thereon "upline" along the conveyor and out of the way of the filled pocket of product unit 28 as it is folded back.

After passage of this product unit 28 through the fold mechanism 74, the fold mechanism is returned to the "ready" position and crease plate structure 76 lifted by retraction of fluid actuator 104 to clear the next product unit.

Figure 5:
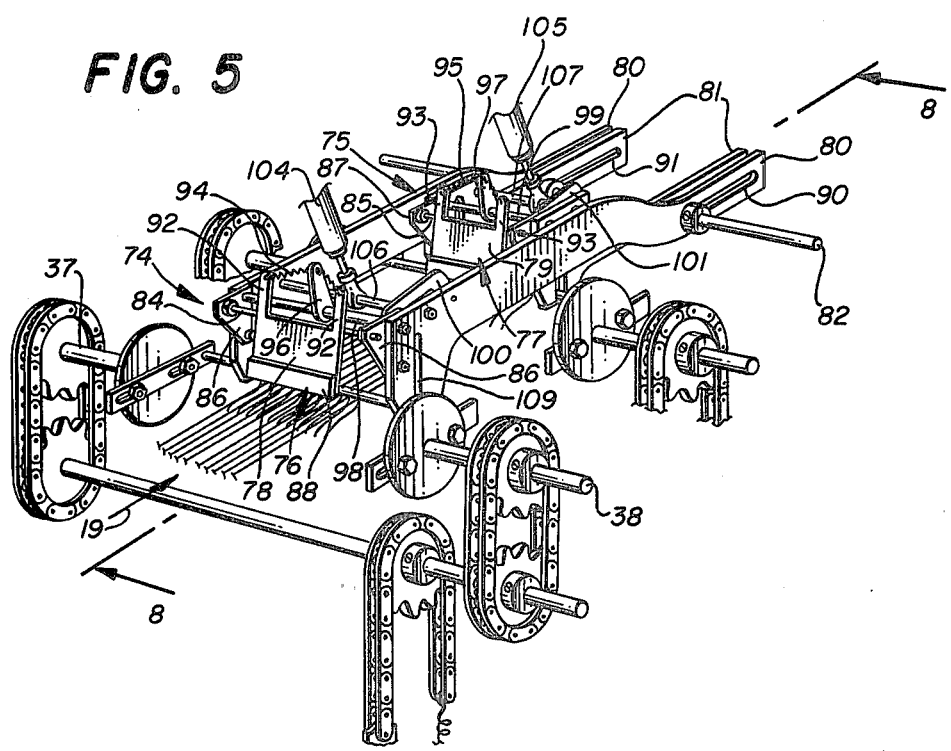
FIG. 5 is a schematic perspective view of the output or backend portion of the processor of the present invention including the two last fold stations also with many parts cut away or totally omitted for better illustration.

The position of the second transverse fold line in product unit 28 is determined by where the plate 78 contacts the product unit when the crease plate structure 77 is lowered by actuator 104. As shown in FIGS. 5 and 8, weight 88 tends to cause plate 78 to hang in an essentially vertical position. Tension from springs 94 connected between tab extensions 92 and lever arm 96, however, pulls the plate 78 to a slightly inclined position. The angle of incline of plate 78 determines where the lower edge of plate 78 contacts product unit 28 and thus the position of the fold crease.

The tension of springs 94 is adjusted by rotational movement of lever arm 96 by means of adjustment bracket 100. Rotation of lever arm 96 in a clockwise direction increases the tension on springs 94 and increase the angle of incline of plate 78 to produce a wide fold in product unit 28.

Fold mechanism 75 and crease plate structure 77 operate in the same way as mechanism 74 and structure 76 to accomplish the last fold of product unit 28 to produce the completed burrito product as shown in FIGS. 9B and 10F.

When the last fold has been completed, carrier belts 23 move the product unit 28 to conveyor 15 for further processing such as, cooking, refrigeration, freezing and/or packaging.

Figure 11:
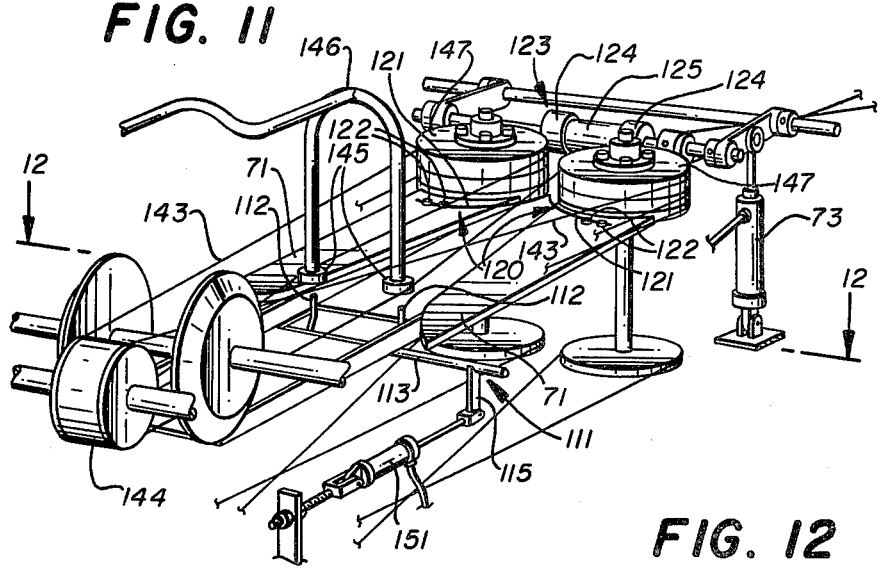
FIG. 11 is a schematic perspective view of portions of the fold mechanism of processer station 20 and of leveling station 21 illustrating certain modifications.
Figure 12:
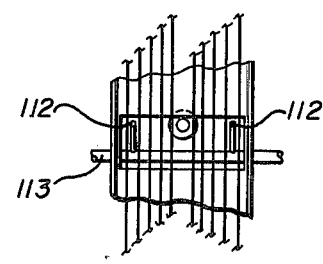
FIG. 12 is a view taken along lines 12—12 of FIG. 11.
Figure 13:
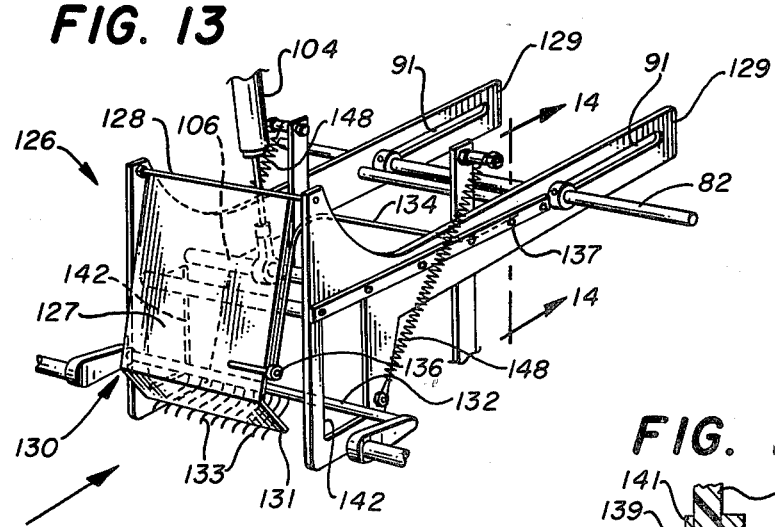
FIG. 13 is a schematic perspective view illustrating certain modifications of the fold mechanisms of station 22.

It has been found that in processing some types of products it may be desirable to modify certain features of the processor or add others for more efficient operation. FIGS. 11, 12 and 13 illustrate some of these modifications.

For example, certain types of products tend to become skewed as they progress from station 18 to station 20. Thus, there may be provided a product "squaring" or straightening mechanism 111 as shown in FIGS. 11 and 12. Squaring mechanism 111 comprises a pair of angled stop bars 112 mounted on transverse shaft 113 disposed below the conveyor bands 23. Shaft 113 is journaled for rotation in the frame 12 not shown in this view. A crankarm 115 on shaft 113 is operated by fluid actuator 151 under the control of a control valve such as valves 35 but not here shown. A photo sensor 117 is positioned between stop bars 112 below the conveyor bands 23.

In their normal operating position, stop bars 112 extend upwardly between conveyor bands 23 to a height sufficient to catch and hold the leading edge of a product unit. Should a product unit approach the squaring mechanism 111 in a skewed position, that is, with the edge of the first fold not being essentially straight across the conveyor, the most forward part of the product unit will be contacted and held by one or the other of the stop bars 112. The other side of the product unit continues to be carried forward by the conveyor bands 23 until the front folded edge of the product unit is essentially "square". Photo sensor 117 positioned just slightly ahead of stop bars 112 detects the front edge of the product unit as it is just reaching the "square" position. In response to a detection signal from photo sensor 117 the control valve operates actuator 151 to pull crank arm 115 and retract stop bars 112 from the conveyor path. Retraction of the stop bars 112 releases the straightened product unit for continued movement along the conveyor.

At times it is desirable to use the processor of the present invention for food products in which the wrapper material is uncooked or only partially cooked. Such wrappers may, at times, be excessively "tacky" and tend to adhere to the folder belts. A stripper apparatus 120 is provided to prevent entanglement of the wrapper material in the folder belts and pulleys. In its simplest form, stripper apparatus 120 comprises a pair of curved members 121 of smooth surfaced spring wire or flat strip material anchored at one end by fasteners 122 on backing plate 71. The members 121 extend in an arcuate bend past the folder belts into the conveyor path of the processor as shown in FIG. 11. Any wrappers tending to stick to the folder belts will be brushed away from the belts and released as the product 28 moves past the stripper apparatus 120.

For many types of products, it is desirable to do more at station 21 than merely even and level the filler material in the fold pocket of the product units. For example, in order to provide a sealed seam at the sides along the longitudinal folds of the product units, a roller 123 of different shape may be substituted for leveling roller 72. As shown in FIG. 11, roller 123 has a smooth surface and a stepped configuration. Surface regions 124 at the outer ends on roller 123 are of a larger diameter than central surface region 125. Thus, when roller 123 is pulled down into rolling contact with a product unit by acuator 73, surfaces 124 act to press the folded edges of the product together into a seal. At the same time the pocket filler of the product is evenly distributed and a smooth pocket surface is formed by roller surface 125.

Figure 3:
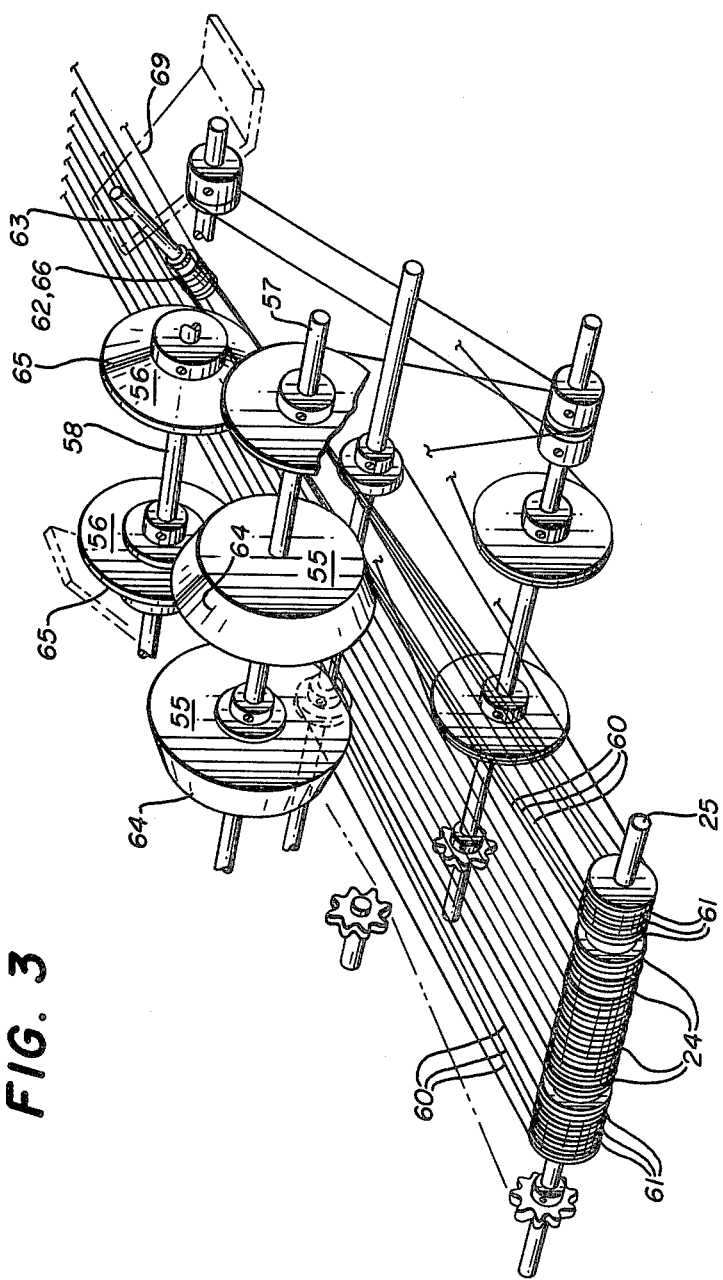
FIG. 3 is a schematic perspective view of a portion or the longitudinal crease and side fold mechanisms of the present invention with many parts cut away or totally removed for better illustration.

In other modifications of the station 20 fold mechanism shown in FIG. 11, folder belts are provided in a slightly different routing configuration from folder belts 69 of the embodiments of FIGS. 2 through 4. For example, the upper folder belts 143 run from the under side of drum pulley 144 (added in this embodiment) around the outer surfaces of pulleys 145 on "U" bracket 146 (also added in this embodiment) to the inner surface of pulleys 147. After rounding pulleys 147, the belts 143 run back to the top side of drum pulley 144. Pulleys 147 are a modified form of pulleys 67 of the embodiment of FIGS. 2 through 4.

Figure 14:
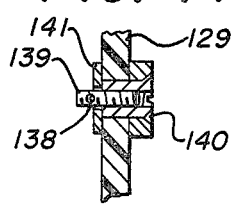
FIG. 14 is a view in section taken along lines 14—14 of FIG. 13.

In some products the consistency of the product wrapper material makes desirable a more positive creasing action in the transverse fold mechanisms of station 22. Shown in FIG. 13 is a modified fold mechanism 126 which may be used in place of fold mechanism 74 and/or 75. In fold mechanism 126, crease plate 127 is pivotally mounted at its upper end by attachment to rod 128 between slot brackets 129. At its lower end crease plate 127 is angled at 130 so that the lower edge 131 faces slightly backward toward folder rod 132 and tines 133. The crease plate 127 is positioned by the angled wire spring 134 attached at one end to the plate 127 at 136. The other end of string 134 is adjustably attached to the bracket 129 by screw clamp 137. As can be seen in the detailed section of FIG. 14, spring 134 is clamped into place by passing it through the transverse opening 138 of the threaded stud 139. By turning internally threaded screw member 140, stud 139 is drawn over until the spring wire 134 is clamped tightly against washer 141.

Bracket shaft 82, slots 91, fluid actuator 104 and rod 106 are as in the fold mechanism 74 of FIGS. 5 through 8. In the fold mechanism 126 wider slots 142 replace slots 109 of fold mechanism 74. Springs 148 provide positive retraction of the crease plate structure to its "up" position when actuator 104 is deactivated.

Thus, there has been disclosed an automated food processor useful in the preparation of rolled sandwich type food products such as burritos. Many changes and modifications still within the spirit and scope of the teachings herein may occur to those skilled in the art and, therefore, it is intended that this invention be limited only as set forth in the following claims.

Having described our invention, we claim:

1. A food processing machine for folding rolled sandwich-type food products having a plurality of laterally spaced conveyor bands to carry a relatively thin flat wrapper of a food product along a generally horizontal path and a folding mechanism disposed over said conveyor bands; said folding mechanism comprising bracket members rotatably mounted on either side of said plurality of conveyor bands; a cross-member; means securing said cross-member between said bracket members for arcuate rotation of said cross-member above said conveyor bands about an axis lying generally perpendicular to the direction of movement of said conveyor bands from a first position to a second position; and a plurality of tine members extending from the cross-member between said conveyor bands and then beneath said bands in a direction generally opposite to that of the movement of said bands when said cross-member is in said first position, said tine members extending above said cross-member and bands and then in a direction generally the same as the direction of movement of said bands when said cross-member is in said second position whereby the forward part of a flat food product carried by said conveyor bands past said fold mechanism is folded in a transverse fold back over the following part of said food product by said tine members with the movement of said cross-member from said first position to said second position.

2. The food processing machine as defined in claim 1 further comprising means operative to detect the arrival of a food product carried by said conveyor bands at a position to be folded by said fold mechanisms and to initiate in response thereto the arcuate movement of said bracket member to move said cross-member from said first position to said second position.

3. The food processing machine as defined in claim 2 wherein said means to detect comprises a photosensor.

4. The food processing machine as defined in any one of claims 1–3 further comprising a crease plate structure including a crease plate member mounted in front of said bracket members and at a sufficient height to allow food products carried by said conveyor bans to pass thereunder; and means to lower said crease plate into contact with said food products just prior to movement of said bracket members from said first position to said second position thereby to define a fold line in said food product.

5. The food processing machine as defined in claim 4 wherein said crease plate structure further includes means to adjust the location on said food product contacted by said crease plate when lowered.

6. The food processing machine as defined in any one of claims 1–3 further comprising means to maintain said bracket members in said second position until passage beyond said fold mechanism of a food product folded thereby and thereafter to return said bracket members to said first position whereby said food product is carried by said conveyor bands in continuous movement and single orientation past said fold mechanism.

7. The food processing machine as defined in claim 4 further comprising means to maintain said bracket members in said second position until passage beyond said fold mechanism of a food product folded thereby and thereafter to return said bracket to said first position whereby said food product is carried by said conveyor bands in continuous movement and single orientation past said fold mechanism.

8. The food processing machine defined in claim 4 wherein said crease plate structure is coupled to move horizontally with the horizontal component of movement of the cross-member.

9. A food processing machine for folding rolled sandwich type food products having a plurality of conveyor bands to carry a relatively thin flat wrapper of a food product along a generally horizontal path and a folding mechanism comprising means along said horizontal path to change the tangent line between at least the two outermost adjacent bands of said plurality of bands from an essentially horizontal orientation to a near vertical orientation as said bands progress in their movement along said path whereby at least one outer portion of said food product is lifted and urged into a longitudinal flap-fold across a mid-section of said food product as it progresses down said horizontal path.

10. The food processing machine as defined in claim 9 wherein said means along said horizontal path comprise a plurality of guide pulleys establishing the paths of said at least two outermost adjacent bands, the axes of said guide pulleys being at different orientations progressively along said path from essentially horizontal toward the front end of said mechanism to near vertical toward the back end of said mechanism.

11. The food processing machine of claim 10 wherein said guide pulleys toward the back end of said mechanism are of larger diameter than said guide pulleys toward the front end of mechanism.

12. The food processing machine as defined in claim 10 wherein said means along said horizontal path further comprise at least one crease wheel member of generally frustro-conical shape having an inclined surface bearing against said at least two outermost adjacent conveyor bands and establishing said tangent line therebetween at that location and having the larger diameter edge of said inclined surface positioned to contact a food product carried by said conveyor band thereby to establish a longitudinal fold line in said product.

13. The food processing machine as defined in any one of claims 9–12 wherein the paths of said at least two outermost adjacent conveyor bands are inclined inwardly toward the center line of said horizontal path toward the back end of mechanism.

14. The food processing machine of claim 13 further including a backing plate member positioned along the paths of said at least two outermost adjacent conveyor bands toward the back end of mechanism where said paths are inclined toward said center line.

15. The food processing machine of claim 14 wherein said at least two outermost adjacent conveyor bands and said backing plate member are positioned sufficiently above said horizontal path toward the back end of said mechanism to allow passage of said food product thereunder.

16. The food processing machine as defined in any of one claims 9-12 wherein said tangent line passes through the vertical orientation.

17. A food processing machine for folding rolled sandwich-type food products comprising a plurality of laterally spaced conveyor bands to carry a relatively thin flat wrapper of a food product along a generally horizontal path through a plurality of fold operations, a first folding mechanism disposed over said conveyor bands and a second folding mechanism; said first folding mechanism comprising: leg members mounted on either side of said plurality of conveyor bands; a cross-member secured between said leg members to form a "U" shaped bracket; means rotatably supporting said leg members for arcuate rotation of said bracket above said conveyor bands about an axis lying generally perpendicular to the direction of movement of said conveyor bands from a first position to a second position; and a plurality of tine members extending from the cross-member of said braket between said conveyor bands and then beneath said bands in a direction generally opposite to that of the movement of said bands when said bracket is in said first position and extending above said bracket and bands and then in a direction generally the same as the movement of said bands when said bracket is in said second position, whereby the forward part of a flat food product carried by said conveyor bands past said fold mechanism is folded in a transverse fold back over the following part of said food product by said tine members with movement of said bracket from said first position to said second position; said second folding mechanism comprising means along said horizontal path to change the tangent line between at least the two outermost adjacent bands of said plurality of bands from an essentially horizontal orientation to a near vertical orientation as said bands progress in their movement along said path whereby at least one outer portion of said food product is lifted and urged into a longitudinal flap fold across a mid-section of said food product as it progresses down said horizontal path.

18. A food processing machine as defined in claim 17 further comprising a third folding mechanism of the same type as said first folding mechanism and further comprising a creaser member mounted in front of the bracket means of said third folding member and at a sufficient height to allow food products carried by said conveyor bands to pass thereunder, said creaser member being adapted to be lowered on to said food products just prior to movement of said bracket of said third folding mechanism from said first position to said second position thereby to define a transverse fold line in said food product.

19. A food processing machine as defined in claim 18 further comprising a fourth folding mechanism and creaser plate member of the same type and construction as said third folding mechanism and creaser plate member.

20. The processing machine as defined in claim 17 further including means operative to detect the arrival of a food product carried by said conveyor bands at a position to be folded by said first folding mechanism and to initiate in response thereto the arcuate movement of said bracket member from said first position to said second position.

21. The food processing machine as defined in claim 19 further comprising means operative to detect the arrival of food products carried by said conveyor bands at the positions to be folded by each of said folding mechanisms and to initiate in response thereto the arcuate movement of said bracket member of the respective fold mechanisms from said first position to said second position.

22. The food processing machine as defined in any one of claims 17-21 wherein said means along said horizontal path comprises a plurality of guide pulleys establishing the paths of said at least two outermost adjacent bands, the axes of said guide pulleys being at different orientations progressively along said path from essentially horizontal toward the front end of said processing machine to near vertical toward the back end of said processing machine and further comprising at least one crease wheel member of generally frustro-conical shape having an inclined surface bearing against said at least two outermost adjacent conveyor bands and establishing said tangent line therebetween at that location and having the larger diameter edge of said inclined surface positioned to contact a food product carried by said conveyor bands, thereby to establish a longitudinal fold line in said product.

23. The food processing machine as defined in claim 22 wherein the paths of said at least two outermost adjacent conveyor bands are inclined inwardly toward the center line of said horizontal path toward the back end of said second fold mechanism.

24. The food processing machine as defined in claim 23 further including a backing plate member positioned along the paths of said at least two outermost adjacent conveyor bands toward the back end of said second fold mechanism where said paths are inclined toward said center line.

25. The food processing machine as defined in claim 19 wherein said means along said horizontal path comprise a plurality of guide pulleys establishing the paths of said at least two outermost adjacent bands, the axes of said guide pulleys being at different orientations progressively along said path from essentially horizontal toward the front end of said second fold mechanism to near vertical toward the back end of said second fold mechanism.

26. The food processing machine as defined in any one of claims 17-21 further comprising means to maintain each of said bracket means in said second position until passage beyond the folding mechanism incorporating said bracket means of a food product folded thereby and thereafter to return said bracket means to said first position whereby said food product is carried by said conveyor bands in continuous movement and single orientation past said fold mechanisms.

27. The food processing machine as defined in claim 22 further comprising means to maintain each of said bracket means in said second position until passage beyond the folding mechanism incorporating said bracket means of a food product folded thereby and thereafter to return said bracket means to said first position whereby said food product is carried by said conveyor bands in continuous movement and single orientation past said fold mechanisms.

28. The food processing machine as defined in claim 25 wherein the paths of said at least two outermost adjacent conveyor bands are inclined inwardly toward the center line of said horizontal path toward the back end of said second fold mechanism.

29. The food processing machine as defined in claim 28 further including a backing plate member positioned along the paths of said at least two outermost adjacent conveyor bands toward the back end of said second fold mechanism where said paths are inclined toward said center line.

* * * * *

UNITED STATES PATENT AND TRADEMARK OFFICE
CERTIFICATE OF CORRECTION

PATENT NO. : 4,483,242

DATED : November 20, 1984

INVENTOR(S) : William D. Goodman; Dan Sutherland

It is certified that error appears in the above-identified patent and that said Letters Patent is hereby corrected as shown below:

Abstract, line 11, delete "and"

Column 9, line 59, change "bans" to -- bands --

Column 11, line 22, change "braket" to -- bracket --

Signed and Sealed this

Sixteenth Day of April 1985

[SEAL]

Attest:

DONALD J. QUIGG

Attesting Officer  Acting Commissioner of Patents and Trademarks